(12) United States Patent
Sands

(10) Patent No.: US 6,631,188 B1
(45) Date of Patent: Oct. 7, 2003

(54) DYNAMIC CALL WAITING BASED ON CALLER ID

(75) Inventor: Phillip Michael Sands, Champaign, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 300 days.

(21) Appl. No.: 09/606,516

(22) Filed: Jun. 29, 2000

(51) Int. Cl.$^7$ .......................... H04M 1/57; H04M 1/64; H04M 3/42
(52) U.S. Cl. .................. 379/215.01; 379/88.21; 379/88.26; 379/142.08; 379/210.01; 379/211.02
(58) Field of Search ............... 379/88.01, 88.2, 379/88.21, 88.22, 88.25, 88.26, 142.08, 196, 197, 198, 199, 210.01, 211.02, 212.01, 214.01, 215.01

(56) References Cited

U.S. PATENT DOCUMENTS 5,999,611 A * 12/1999 Tatchell et al. .......... 379/88.01

* cited by examiner

Primary Examiner—Harry S. Hong

(57) ABSTRACT

Incoming calls from selected calling numbers are routed to call waiting for immediate response while calls from other calling numbers are handled in a different manner, e.g., they are routed to voice mail, to a forwarding number, or scheduled for call back. In order to route calls from selected calling numbers to call waiting, the subscriber enters the directory numbers of selected callers (or other caller identifying indicia) on the subscriber's telephone keypad together with an activation code for storing this information in a caller identification (ID) table, or data base. Each time an incoming call is received, the incoming call number (or other caller identifying indicia) is compared with the contents of the caller ID table and the call is routed to the call waiting function if the incoming call number is stored in the caller ID table.

12 Claims, 6 Drawing Sheets

DYNAMIC CALL WAITING BASED ON CALLER ID

FIELD OF THE INVENTION

This invention relates generally to the processing of incoming telephone calls and is particularly directed to automatically directing incoming calls from selected calling numbers to call waiting, while directing calls from non-selected calling numbers to alternate call treatment, such as to voice mail or a forwarding number.

BACKGROUND OF THE INVENTION

Automatic telephone call processing has gained widespread acceptance for accomplishing a wide variety of functions. One common application known as call waiting alerts a subscriber engaged in a telephone call to a second incoming call and permits this subscriber to interrupt the first call and respond to the second caller. Another current popular feature known as caller "ID", i.e., identification, informs the incoming call subscriber of the identity of the incoming call originator by displaying either the telephone number or other identifying indicia of the caller. Current systems are not selective in their approach, i.e., for a subscriber with these two features, all incoming calls are routed to the call waiting and caller ID functions. Current systems do not allow for the selective routing of incoming telephone calls based upon the identity of the caller.

The present invention addresses the aforementioned limitations of the prior art by providing dynamic call waiting based upon the caller's ID which permits a subscriber to route selected incoming calls to call waiting, while permitting nonselected incoming calls to undergo alternative call treatment, e.g. route to voice mail, call forwarding to another number or call back.

SUMMARY OF THE INVENTION

The present invention employs dynamic call waiting based on the caller's ID, permitting a called subscriber to route incoming call to call waiting based upon the ID information of the calling party. The telephone number, or other selected caller ID indicia, is stored by the subscriber in a Calling Number Data Base (CNDB). This information is entered by the subscriber either via a keypad or by voice which undergoes speech-to-text conversion. Receipt of an incoming call initiates comparison of the calling party's caller ID information, such as the incoming call telephone number or other caller identifying indicia, with the selected caller data stored in the CNDB. The presence of incoming caller indicia in the CNDB automatically routes the incoming call to call waiting to permit the called subscriber to immediately respond to the incoming call. If the incoming caller indicia is not stored in the CNDB, the incoming call undergoes default or alternative call treatment, such as voice mail, routing to a designated forwarding number, or call back. Dynamic call waiting based on the caller's ID is carried out under the control of a microprocessor located either in a subscriber's caller ID unit or at a telephone network processing center. Text-to-speech conversion may also be applied for providing the called subscriber with an audio indication of the caller's ID. An activation code may be used by the subscriber for storing selected calling party numbers, or other identifying information, in the CNDB. Selected calling numbers may be stored in, reviewed, updated or deleted from the CNDB by appropriate coded inputs to the subscriber's keypad or by predetermined voice inputs.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
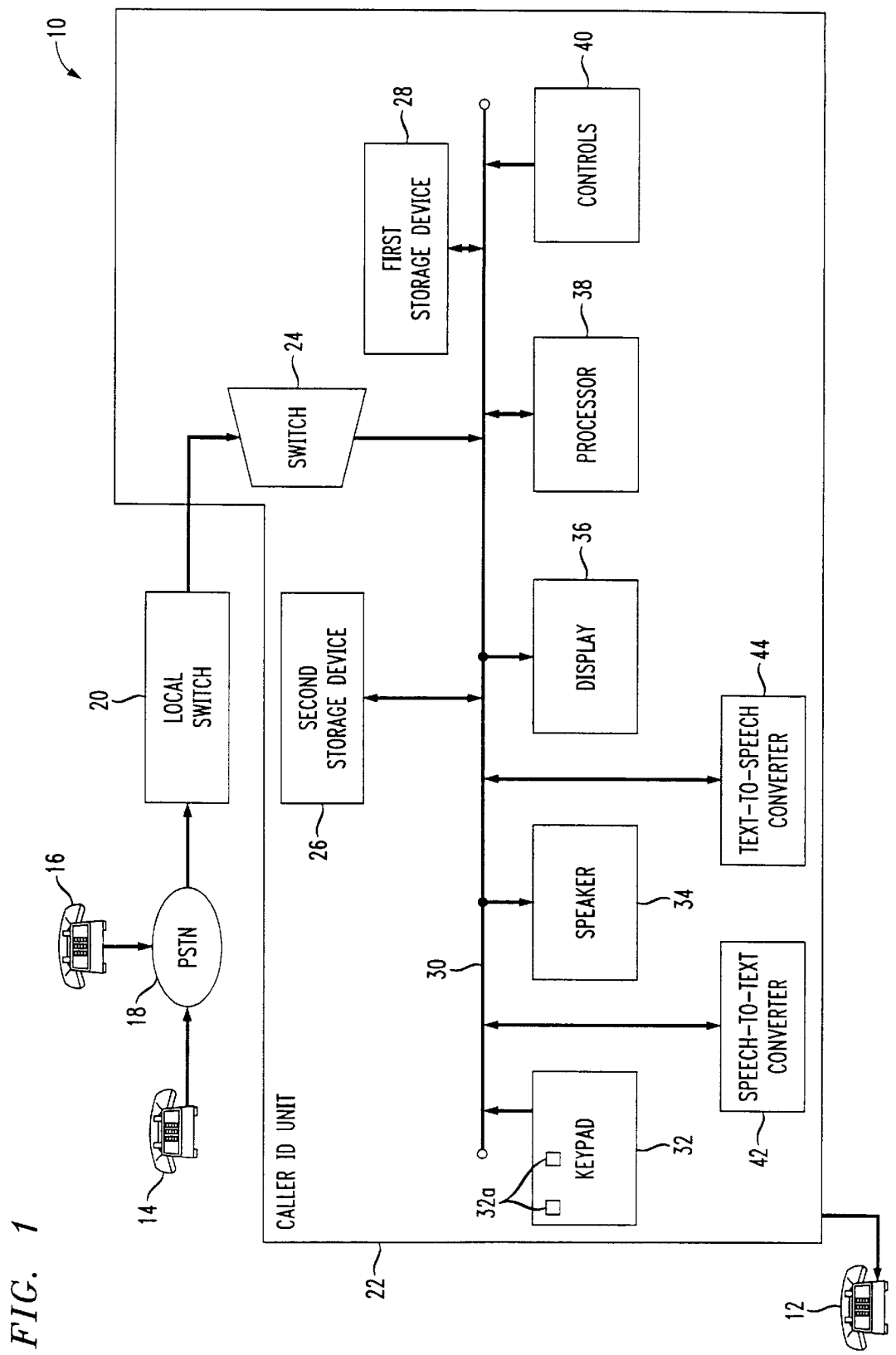
FIG. 1 is a simplified block diagram of one embodiment of a dynamic call waiting system based on caller ID, wherein selected calling numbers are stored and processed at the subscriber's location.

Referring to FIG. 1, there is shown one embodiment of a dynamic call waiting system 10 based on the caller identification (ID) in accordance with the present invention.

Referring to FIG. 1, there is shown a simplified combined schematic and block diagram of a dynamic call waiting system 10 which employs caller identification (ID) information in accordance with the principles of the present invention. Dynamic call waiting system 10 includes first, second and third telephone terminals 12, 14 and 16 which are in communication by means of a public switched telephone network (PSTN) 18. The present invention is intended for use in the situation where the first telephone terminal 12, which is assigned directory number (630) 555-7340, is communicating with the second telephone terminal 14, which is assigned directory number (303) 555-1976, and an incoming call from the third telephone terminal 16, which is assigned a directory number of (309) 555-8055, is received by the first telephone terminal via PSTN 18. In the embodiment shown in FIG. 1, the first telephone terminal 12 is connected to the PSTN 18 by means of a local switch 20, which is part of the PSTN, and a caller ID unit 22. Caller ID unit 22 is a remote device located with the first telephone terminal 12, commonly referred to as customer premises equipment (CPE). The present invention allows a subscriber located at the first telephone terminal 12 to store selected calling numbers, or other indicia associated with selected callers, for routing calls from the selected callers to call waiting, while routing incoming calls from other callers in another manner, such as to voice mail, to a forwarding telephone number, busy tone or call back.

Local switch 20 is conventional in design and operation and is typically used for interfacing a telephone terminal with a PSTN 18. The caller ID unit 22 includes an internal switch 24 coupled to both the caller ID unit and the local switch 20 for communicating with PSTN 18. Caller ID unit 22 further includes a data/control bus 30 coupled to the internal switch 24 for receiving incoming calls from the local switch 20 and for providing outgoing calls to the local switch.

In accordance with the present invention, an internal storage device 28 (e.g., memory) is coupled to the data/control bus 30 for storing selected calling numbers. Selected calling numbers are entered on a keypad 32 with coded entry keys 32a by the subscriber and are provided to a first storage device 28 by means of the data/control bus 30. Caller information from an incoming call is provided to a second internal storage device 26 (e.g., scratch memory) by means of the data/control bus 30. A processor 38 in the caller ID unit 22 reads the incoming caller information from the second storage device 26 and compares it to the list of calling numbers stored in the first storage device 28. If a calling number associated with an incoming call, as read from the second storage device 26, is determined by processor 38 to be stored in the first storage device 28, the incoming call is routed to a caller ID function for alerting the subscriber communicating on the first telephone terminal 12 of the identity of the caller. This information is provided to the subscriber by means of a video display 36 which lists either the incoming calling number or the caller's name or other identifying indicia. Receipt of an incoming call from a previously stored calling number may also be provided to the subscriber in the form of an audio signal such as by means of a speaker 34. In this regard, a text-to-speech converter 44 may be used to convert an electronic signal representing the identity of a selected incoming caller to an audio message such as "John Smith is on call waiting". In addition, a speech-to-text convertor 42 may be used for the entry of selected incoming call numbers, or other selected caller indicia, for storage in the first storage device 28 as an alternative to entry of this information via keypad 32. Caller ID unit 22 further includes various controls 40 such as for providing routing for incoming calls other than by means of the calling waiting function. Controls 40 also permit a subscriber to select either keypad 32 or speech-to-text convertor 42 for the voice entry of selected caller numbers or selected caller indicia. Controls 40 also permit the subscriber to select either speaker 34 in combination with the text-to-speech convertor 44 or display 36 for providing incoming caller information to the subscriber. Controls 40 may be selected by the subscriber by conventional means such as coded key entries via keypad 32. Processor 38 is conventional in design and operation and may take the form of any number of conventional microprocessors used in the storage and processing of data with software, making decisions based upon this data, and providing appropriate output signals.

Figure 2:
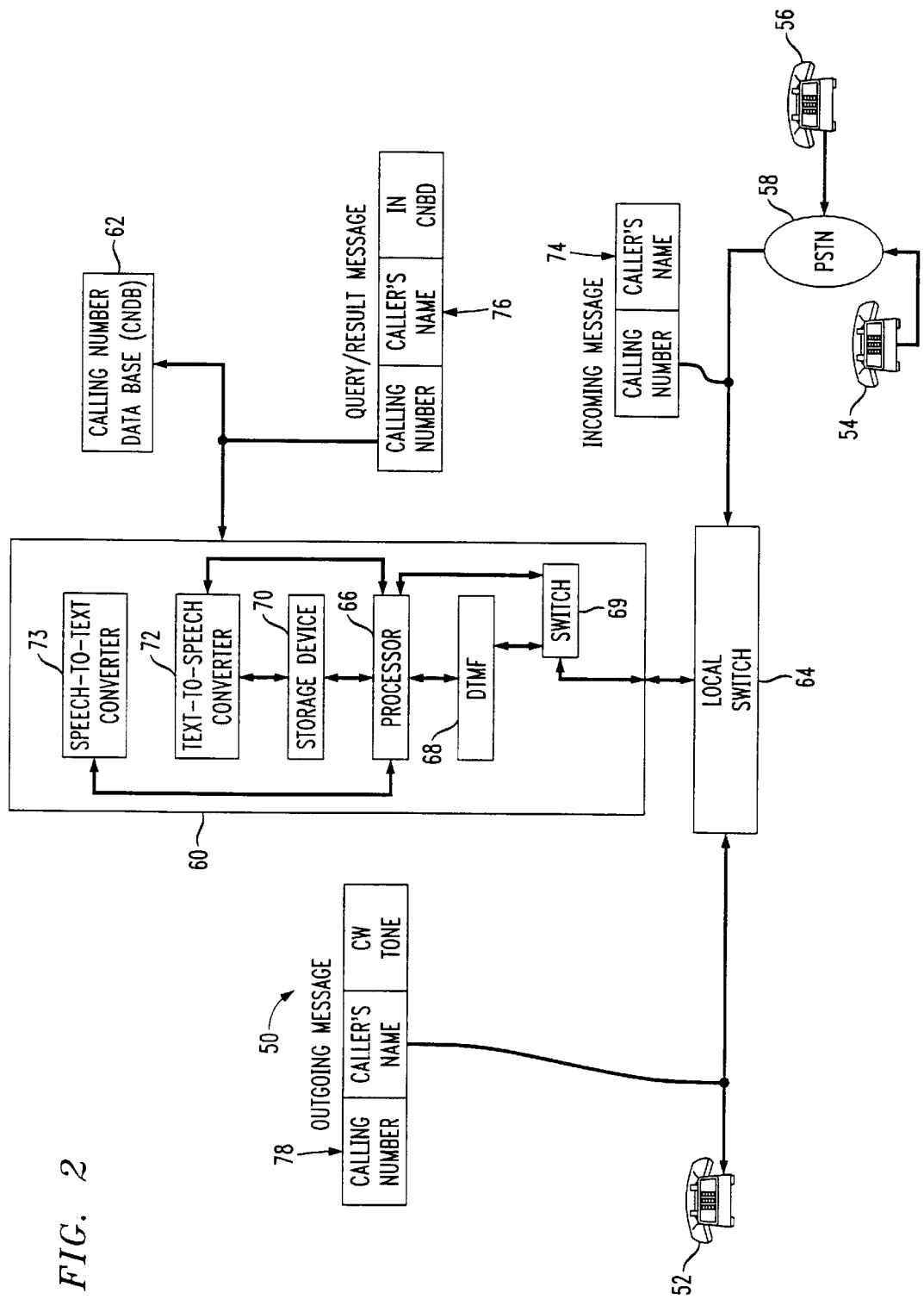
FIG. 2 is a simplified block diagram of another embodiment of a dynamic call waiting system based on caller ID, wherein selected calling numbers are processed and stored at a central location in the telephone network for use by all subscribers.

Referring to FIG. 2, there is shown another embodiment of a dynamic call waiting system 50 in accordance with the present invention. In the embodiment shown in FIG. 2, selected calling numbers are stored in, and incoming call information is provided to, a central location in the telephone network. In the arrangement shown in FIG. 2, a first telephone terminal 52 is in communication with a second telephone terminal 54 by means of a local switch 64 and a PSTN 58. While the first telephone terminal 52 is communicating with the second terminal 54, an incoming call from a third telephone terminal 56 is received by the first telephone terminal. In accordance with the present invention, the telephone call received from the third telephone terminal 56 is either provided call waiting status for immediate attention by the subscriber at the first telephone terminal 52, or the incoming call from the third telephone terminal is processed in another manner, such as, for example, by routing to another telephone number or being directed to voice mail as described below.

The incoming call from the third telephone terminal 56 to the first telephone terminal 52 includes an incoming message 74 provided on the input line to the local switch 64. The incoming message 74 includes the calling number and/or other caller indicia such as the caller's name. The incoming call, including the incoming message portion 74 thereof is provided to a controller 60 in the dynamic call waiting system 50 via the local switch 64. Prior to receipt of the incoming call, a subscriber at the first telephone terminal 52 has entered one or more selected calling numbers and/or callers' names by means of a keypad or voice activated device as previously described. The selected numbers are entered via the subscriber's telephone terminal or by voice via the same terminal. Voice entry may be invoked via a keying sequence. The key pad and voice activated device are not shown in FIG. 2 for simplicity, but they would be part of or disposed adjacent the subscriber's first telephone terminal 52 and connected to controller 60.

Controller 60 includes a internal access switch 69 which is connected to a dual-tone multi-frequency (DTMF) detector unit 68, which receives the incoming tones via access switch 69, which in turn receives these tones from the local switch 64. DTMF detector 68 provides these tones to a processor 68 within the controller 60. The DTMF detector is used to analyze the line information that it has received via the access switch 69 for DTMF signaling as is known in the art. More specifically, the DTMF detector unit 68 is used to detect the subscriber's choice for storing selected calling numbers and providing signals to the processor 66 (from DTMF detector unit 68) to effect the desired operation or store the provided indicia. The access switch 69 is also connected to processor 66, such that, when the switch 69 determines that a message (other than a tone) is received from the local switch 64 it is directed to processor 66 which analyzes these messages and acts accordingly. Access switch 69 could be connected to the signaling network as is known in the art. Also disposed within controller 60 and connected to the processor 66 is a storage device 70, a text-to-speech converter 72, and a speech-to-text converter 73. Each of the storage device 70, text-to-speech converter 72 and speech-to-text converter 73 perform functions similar to those described for the corresponding components in the first embodiment of the invention described above and shown in FIG. 1. Coupled to controller 60 is a calling number database (CNDB) 62 for storing selected calling numbers and/or selected caller indicia. Storage device 70 stores the calling number and/or caller's name presented in the incoming message 74. Processor 66 compares the calling number and/or caller's name presented in the incoming message 74 with those selected calling numbers and callers' names stored in the CNDB 62. A query/result message 76 is transmitted between controller 60 and CNDB 62. The query/result message 76 includes the calling number and/or caller's name in the incoming message 74 received by the controller 60. The query/result message 76 further includes a portion for determining and indicating whether the calling number and/or caller's name in the incoming message 74 is stored in the CNDB 62 and provides the result of this determination back to controller 60. If the controller 60 determines that the calling number and/or caller's name in the incoming message 74 is stored in CNDB 62, processor 62 provides a message to the local switch 64 (through access switch 69) for transmission via an outgoing message to the first telephone terminal 52. Controller 60 could also provide the information via a message to local switch 64. Outgoing message 78 provided to the first telephone terminal 52 includes the incoming calling number and/or caller's name (or other caller indicia) as well as a call waiting (CW) tone to the first telephone terminal 52. This CW tone alerts the subscriber at the first telephone terminal 52 that the incoming call has been directed to call waiting. An internal switch 69 allows the processor to read/activate the DTMF detector or to read input (i.e, messages) directly. The difference between the embodiment of the invention shown in FIG. 1 and the embodiment of the invention shown in FIG. 2 is that in the latter the controller 60 and CNDB 62 are located at central locations in the communications network and are each used by plural subscribers in carrying out the dynamic call waiting based on caller ID of the present invention. In the embodiment of the invention shown in FIG. 1, the caller ID unit 22 is unique to each subscriber and is located with the subscriber's telephone terminal at the subscriber's location. The format and content of the messages described above in terms of the embodiment shown in FIG. 2 are also applicable to the embodiment of the invention shown in FIG. 1.

Figure 3:
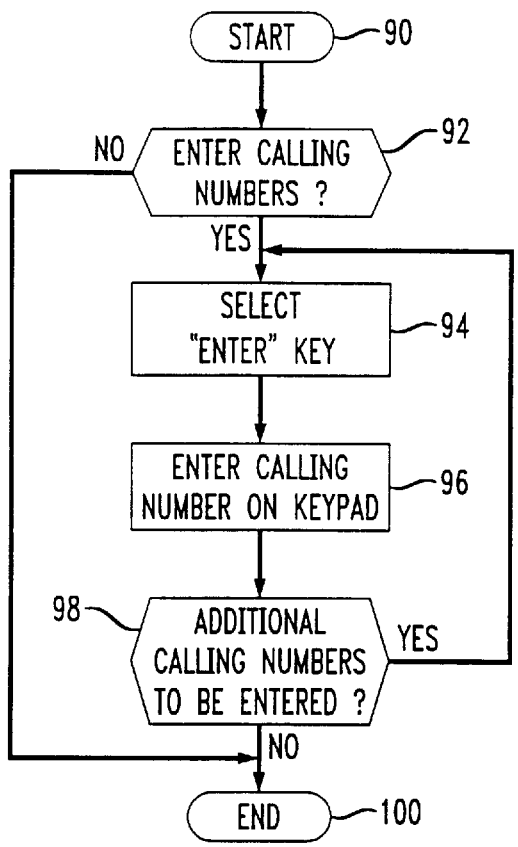
FIG. 3 is a simplified flow chart illustrating the series of steps involved in entering and storing selected calling numbers in accordance with the dynamic call waiting system shown in FIG. 1.

Referring to FIG. 3, there is shown a simplified flow chart illustrating the series of steps undertaken by a subscriber in entering selected calling numbers and/or selected caller indicia for directing incoming calls to call waiting based on the incoming calls caller ID in accordance with one embodiment of the present invention shown in FIG. 1. The process is initiated at step 90 with the subscriber then determining at step 92 whether to enter selected calling numbers and/or selected caller indicia. If there are no selected calling numbers to enter either via the telephone terminal's keypad or by means of a speech-to-text converter as previously described, the process ends at step 100. If the subscriber at step 92 decides to enter selected calling numbers, the subscriber at step 94 first selects the "ENTER" key on the caller ID unit keypad. The subscriber then enters a calling number at step 96 via the keypad for storage in the caller ID unit's storage device for subsequent recall and comparison with incoming calling numbers. If additional calling numbers are to be entered by the subscriber as determined at step 98, the subscriber again selects the "ENTER" key at step 94 for entering additional selected calling numbers at step 96. Once all of the selected calling numbers have been entered and stored in memory, the data entering process ends at step 100.

Figure 4:
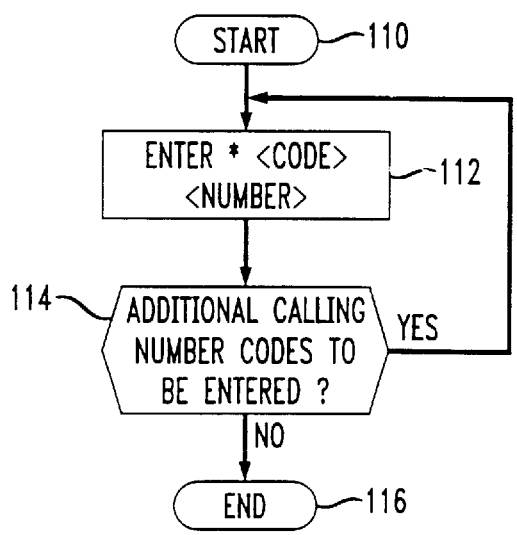
FIG. 4 is a simplified flow chart illustrating the series of steps involved in entering and storing selected calling numbers in accordance with the embodiments of the dynamic call waiting system shown in FIGS. 1 and 2.

Referring to FIG. 4, there is shown a series of steps involved in entering selected calling numbers and/or selected caller indicia in accordance with the embodiment of the invention shown in FIG. 2. The data entering process starts at step 110. It is followed at step 112 by the entering of *[CODE] [NUMBER]. For example, if a subscriber desires to enter a selected calling number (indicia) in the CNDB 62 shown in FIG. 2, the subscriber enters on the telephone terminal keyboard *[CODE] [NUMBER]. The [CODE] can be virtually any number or letter combination available on the subscriber's telephone terminal keypad which has been programmed on the keypad. After entering a predetermined code, the selected calling number is then entered at step 112. If additional selected calling numbers are to be entered as determined at step 114, these additional selected calling numbers are entered and repeated at step 112 until all of the selected calling numbers have been entered and stored in the CNDB 62. The data entering process ends at step 116.

Figure 5:
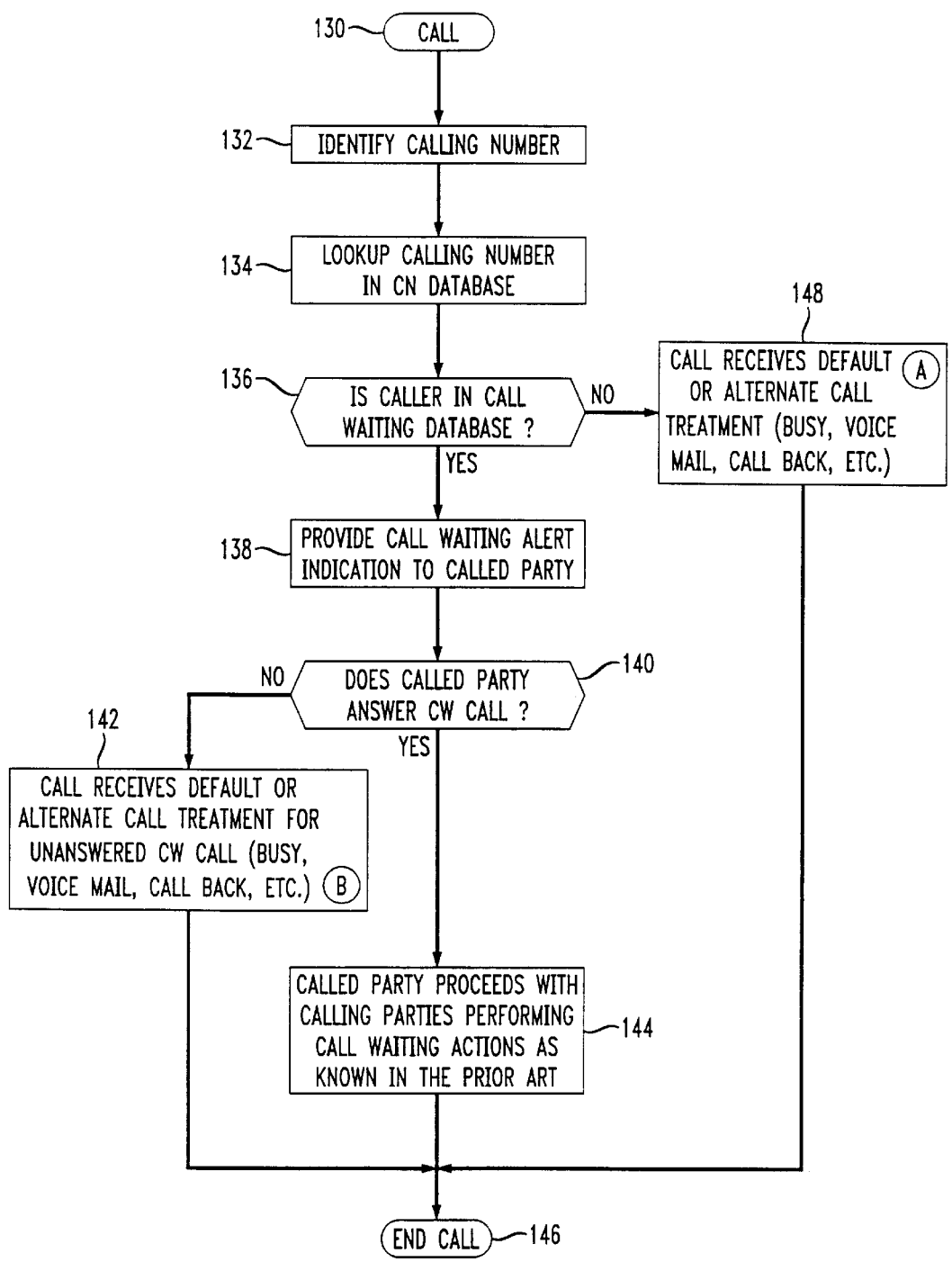
FIGS. 5–7 are simplified flow charts illustrating the series of steps involved in carrying out the dynamic call waiting system based on caller ID of the present invention.
Figure 6:
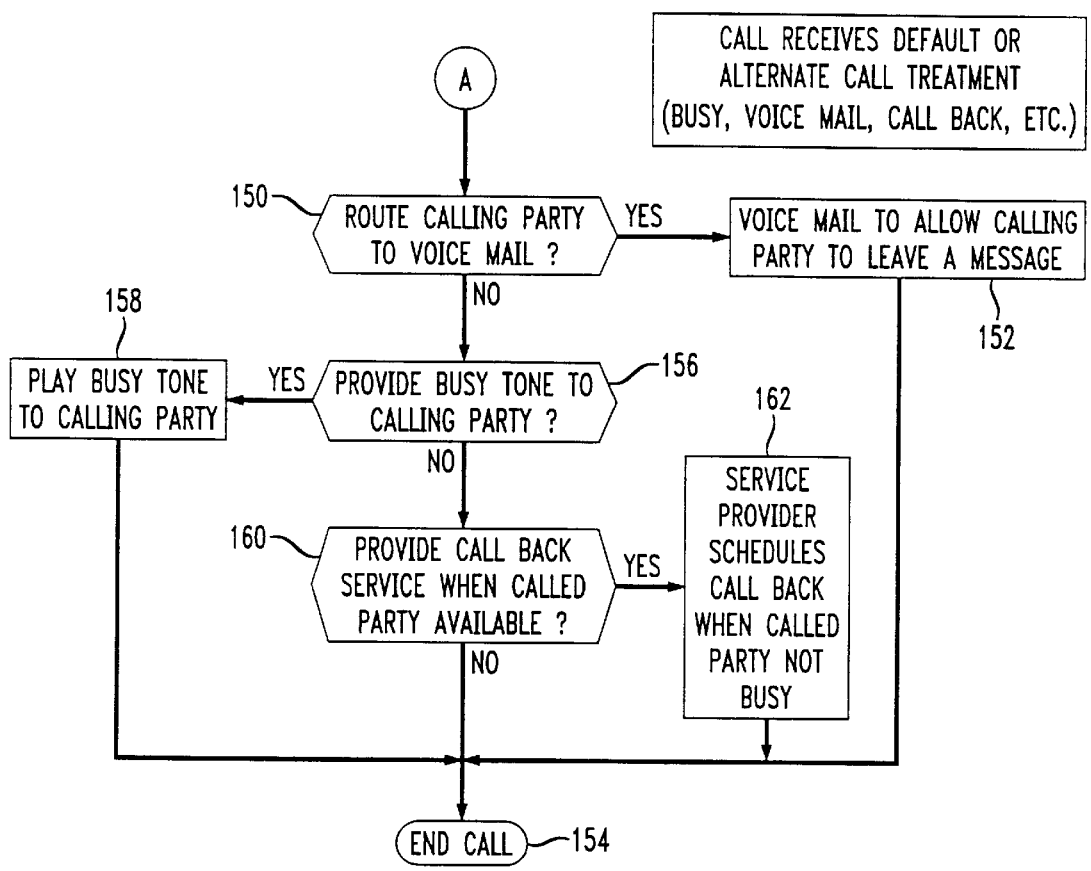
Figure 7:
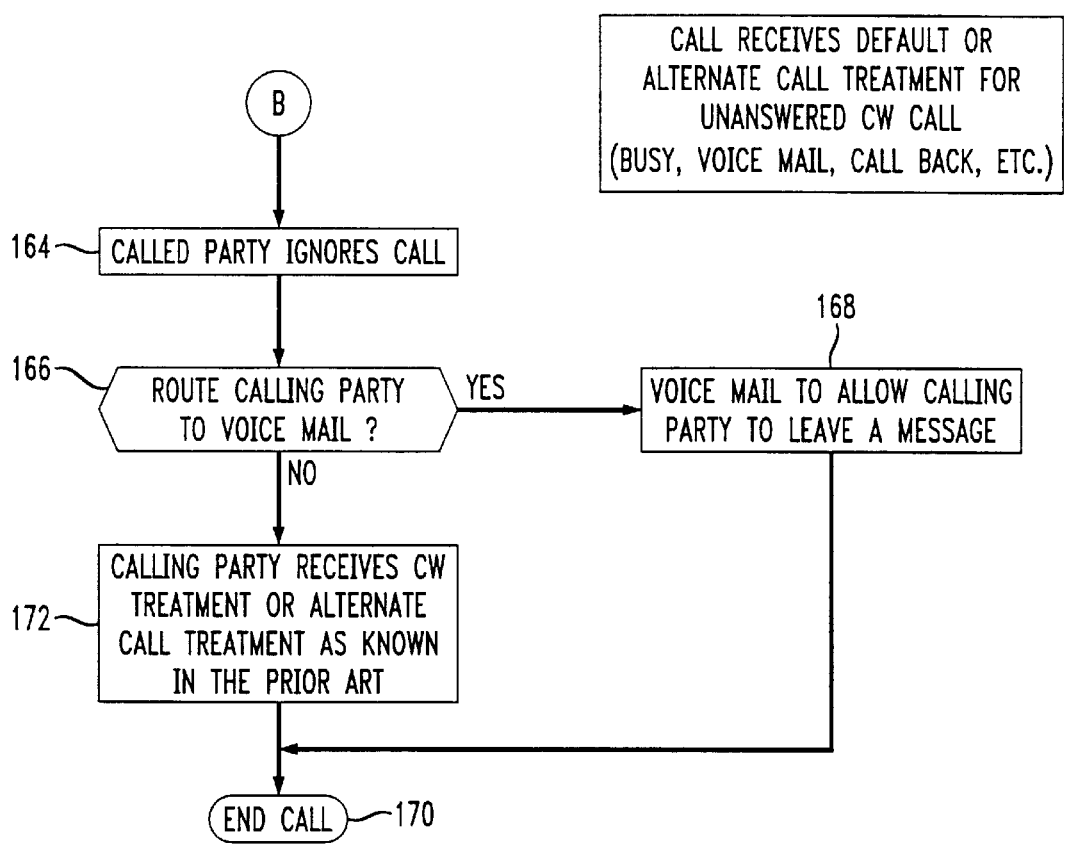

Referring to FIGS. 5, 6 and 7, there are shown a series of steps carried out under the control of a microprocessor in response to subscriber inputs in accordance with the dynamic call waiting based on caller ID of the present invention. The inventive process starts at step 130 with the receipt of an incoming telephone call. The program stored in the microprocessor then identifies the incoming calling ID at step 132 and looks up in this ID list of the various calling ID's stored in the calling number (CN) database, or the CNDB. The program stored in the microprocessor then determines at step 136 if the caller indicia, such as the caller's calling number (or name), is stored in the calling number database. If it is determined at step 136 that the caller's indicia is stored in the calling number database, the program proceeds to step 138 and provides a call waiting alert indication to the called party via the called party's telephone terminal. The common call waiting alert indication is the tone sound provided to the earphone of the called telephone terminal for alerting the called subscriber of a received call waiting telephone call. This alert indication may also be in the form of speech or a video display. The program in the microprocessor then at step 140 determines if the called party answers the call waiting call. If the call waiting is answered by the subscriber, the program proceeds to step 144 for performing the conventional call waiting actions as in prior art call waiting procedures. The program terminates with an end to the call at step 146.

If at step 136, it is determined that the caller indicia is not stored in the calling number database (CNDB), the program proceeds to step 148 with the incoming call receiving a default or other call processing such as a busy signal, routing to voice mail, automatic call back, etc. Typical alternate call treatment is shown in the flow chart of FIG. 6 which is initiated at previously described step 148 as designated by the letter "A" in FIGS. 5 and 6. If the incoming call is to be alternatively routed to voice mail as determined at step 150, the incoming call is directed to voice mail at step 152 to allow the calling party to leave a message for the called party. The call waiting call is then ended at step 154. If at step 150 it is determined that the incoming call is not to be routed to voice mail, the program stored in the microprocessor determines whether or not to provide a busy tone to the call waiting calling party at step 156. If it is determined to provide a busy tone to the calling party, the tone is provided to the calling party's telephone terminal at step 158 followed by an end to the call at step 154. If at step 156, it is determined not to provide a busy tone to the calling party, the program proceeds to step 160 to determine if a call back service is to be provided when the called party is available. If at step 160 it is determined to provide the call back service, the service provider at step 162 schedules a call back to the called party when the called party's line is no longer busy. The call waiting call is then ended at step 154.

If at step 140 of FIG. 5 the called party does not answer the call waiting call, the program proceeds to step 142 and provides a default or alternate call treatment for unanswered call waiting calls. The procedure for providing alternate call treatment for unanswered call waiting calls is shown in the flow chart of FIG. 7 which continues from step 142 in FIG. 5 as shown by the letter "B" in these two figures. If the called party ignores the call waiting indication at step 164, the program then proceeds to step 166 for determining whether to route the call to voice mail. If it is decided not to route the call to voice mail, the program proceeds to step 172 with the calling party receiving call waiting treatment, call forwarding, call back or another call treatment available in the prior art. If at step 166 it is determined to route the calling party to voice mail, the program at step 168 transfers the calling party to voice mail for permitting a message to be left for the called subscriber. The call then ends at step 170.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. For use in a telephone communications network, a method for processing incoming calls from a caller to a called subscriber currently engaged in a telephone call, said method comprising the steps of:

storing selected caller indicia in a storage device, wherein said selected called indicia is stored by the called subscriber in a storage device co-located with a telephone terminal of the called subscriber, without the use of dual-tone multi-frequency signal processing;

receiving an incoming call to the called subscriber, said incoming call including indicia associated with the caller;

comparing said indicia associated with the caller with said selected caller indicia stored in said storage device; and providing a call waiting indication to the called subscriber if said indicia associated with the caller matches said selected caller indicia to permit the called subscriber to interrupt the current telephone call and answer the incoming call from a selected caller; or routing the incoming call in a non-call waiting manner if said indicia associated with the caller does not match said selected caller indicia, wherein said routing includes directing the incoming call to voice mail, a forwarding number, an automatic callback feature, or a busy signal.

2. The method of claim 1 wherein said indicia includes a caller's telephone number, name or address.

3. The method of claim 1 wherein the step of storing selected caller indicia in a storage device includes storing plural indicia each associated with a respective selected caller.

4. The method of claim 1 wherein said selected caller indicia is stored in a storage device by called subscriber inputs to a keypad or by verbal inputs by the called subscriber using a speech-to-text converter.

5. The method of claim 4 wherein the storage of selected caller indicia in a storage device is by means of called subscriber inputs to a keypad including entering a predetermined code followed by entering a selected caller telephone number on said keypad.

6. The method of claim 1 wherein the step of providing a call waiting indication includes providing an audio signal or an audio indication of the identity of the caller using text-to-speech conversion to the called subscriber's telephone terminal.

7. The method of claim 6 wherein the step of providing a call waiting indication further includes providing a visual indication of the identity of the caller.

8. For use in a telephone network, a system for directing incoming telephone calls from a first telephone terminal of a calling subscriber to a second telephone terminal of a called subscriber to a call waiting function on a selected basis, said system comprising:

a storage device for storing data, wherein said storage device is co-located with the second telephone terminal of the called subscriber;

data entry means for storing indicia associated with selected calling subscribers in said storage device by the called subscriber without the use of dual-tone multi-frequency signals;

processing means co-located with and coupled to the second telephone terminal and to said storage device and responsive to an incoming telephone call to the called subscriber for comparing the calling subscriber indicia in the incoming telephone call with the indicia stored in said storage device; and call waiting means coupled to said processing means for providing a call waiting indication to the called subscriber if the calling subscriber indicia in the incoming telephone call is stored in said storage device.

9. The system of claim 8 wherein said data entry means includes a keypad or a speech-to-text converter.

10. The system of claim 8 wherein said indicia includes a calling number from which the incoming telephone call originates or a name of the calling subscriber.

11. The system of claim 8 further comprising a text-to-speech converter coupled to said processing means for providing an audio message to the called subscriber of an incoming telephone call placed on call waiting.

12. The system of claim 8 wherein said data entry means includes a keypad with coded entry keys for storing indicia associated with selected calling subscribers in said memory.

* * * * *